May 28, 1929.   L. W. MUELLER   1,714,802
VALVE FOR BUILT-IN PLUMBING FIXTURES
Filed Oct. 17, 1925
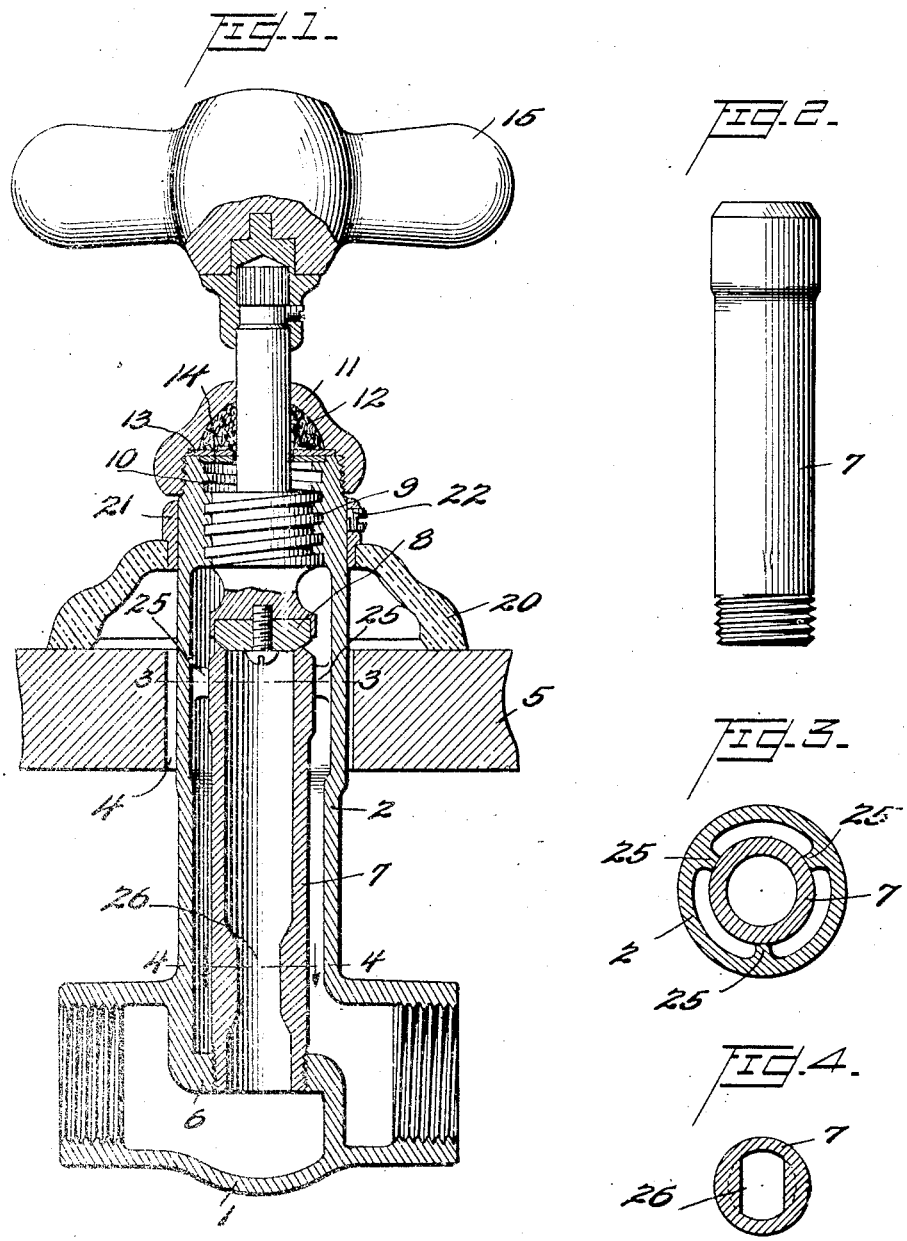
Inventor
Lucien W. Mueller,
By Cushman, Dupont & Darby
Attorneys Patented May 28, 1929.

1,714,802

UNITED STATES PATENT OFFICE.

LUCIEN W. MUELLER, OF DECATUR, ILLINOIS, ASSIGNOR TO ADOLPH MUELLER, TRUSTEE, OF DECATUR, ILLINOIS.

VALVE FOR BUILT-IN PLUMBING FIXTURES.

Application filed October 17, 1925. Serial No. 63,195.

The present invention relates to improvements in valves or stops for built-in plumbing fixtures such as tubs, lavatories, etc., and the object thereof is to provide a valve structure in which the valve seat may be readily removed and replaced when desired without entirely detaching the valve body from the fixture to which it is attached.

In the drawing:

Figure 1 is a sectional view through a valve or stop constructed in accordance with the present invention.

Figure 2 is a view of the valve seat tube detached.

Figure 3 is a section substantially on the line 3—3 of Figure 1.

Figure 4 is a section of the valve seat tube substantially on the line 4—4 of Figure 1.

In the drawing, where corresponding reference characters designate like parts in the several views, 1 designates the body of the casing which, as usual, is provided with suitable inlet and outlet openings and has a lateral tubular extension 2 which extends through an aperture 4 provided in the wall or body 5 of the fixture in connection with which the valve is used.

The particular fitting shown has the lateral extension 2 of considerable length and the body of such fitting is, as usual, divided by a transverse partition 6 in which is formed a threaded passage or opening. A valve seat tube 7 has its inner end reduced and provided with a thread engaging with the aperture in the partition 6, said tube extending outward into the lateral fitting extension 2 and being provided at its outer end with a valve seat with which cooperates a valve 8, the stem of which extends through the outer end of the extension 2 of the main body.

The stem of valve 8 is provided with a threaded section 9 which engages a compression thread 10 that is formed in the inner surface of the lateral extension 2, adjacent the outer end thereof. The outer end of the extension 2 is shown as being closed by a cap 11 within which, about the stem of the valve 8, is arranged a suitable packing 12, washers 13, 14 being shown as interposed between said packing and the outer end of the extension 2 of the main body.

As shown, the valve stem is provided at its outer end with a handle 15 which may be of any desired design.

A housing 20, commonly made of porcelain or similar material, surrounds the extension 2 adjacent the exposed face of the wall or support 5 and a sleeve 21, detachably connected to the extension 2 of the main valve body by a set screw 22 is provided for retaining this housing in position.

The lateral extension 2 is shown as provided with a plurality of inwardly projecting lugs 25 which contact with the outer face of the valve seat tube 7 and assist in retaining it in proper alinement. It will be observed that the upper portion of the tubular extension tube is enlarged so as to provide for proper water-way, which otherwise would be restricted by the thickened or enlarged portion of the valve seat tube 7, which is provided at the upper end to be engaged by the lugs 25 and to form a wall of sufficient thickness to enable a proper valve seat to be formed at the upper end.

The valve seat tube 7 has a section 26 thereof contracted and made of polygonal form in cross section so that when the valve has been withdrawn from the fitting, a tool may be inserted through the outer end of the valve tube and engaged with the reduced bore section 26 and thereby the tube may be rotated to detach the inner threaded end thereof from the partition 6 in the valve body. This polygonal formation will be preferably near the inner or lower end of the valve seat tube 7, as shown, in order that the action of the tool inserted to rotate the tube will be closely adjacent the thread and be more positive than would be the case if the polygonal cross section were located at the upper end of the valve seat tube.

It will be seen that by this means, the valve seat body may be detached and replaced without disengaging the connection between the lateral extension 2 of the main valve body and the wall or member 5. Furthermore, by the construction shown, the valve 8, its compression stem, and its associated parts, are all mounted directly on the interior wall of the tubular extension, without the interposition of any adapter sleeves or other parts, and the cap 11 and enclosing housing 20 are mounted directly upon the outer wall of the tubular extension without the use of any interconnecting parts. This arrangement provides a very simple construction, and one which can be economically produced and assembled while retaining all of the functions necessary to an operative device.

It is believed that the advantages of the invention will be readily appreciated from the foregoing description in connection with the drawing.

It is to be noted that there can be variations in the proportion of the several parts shown without departing from the invention and that some of the features illustrated are shown more or less diagrammatic.

Having thus described the invention, what is claimed is:

1. In a valve structure, the combination of a casing having a body portion provided with an inlet, an outlet and a transversely disposed partition therebetween, a tubular member extending laterally from said body portion, an interior tube removably mounted in said transverse partition and extending into said extension with a valve seat at its outer end, a plurality of integral inwardly projecting members on the inner wall of said tubular member to engage the said interior tube and hold it against lateral movement, a valve in direct threaded engagement with the inner wall of said tubular extension beyond the valve seat, and enclosing and retaining means for the valve member directly and removably secured to the outside of said tubular extension.

2. In a valve structure, the combination of a casing having a body portion provided with an inlet, an outlet and a transversely disposed partition therebetween, a tubular member extending laterally from said body portion and having an outer section of greater diameter than the inner section, adjacent the body, a tube mounted in said transverse partition and extending within said tubular extension, said interior tube having its outer end enlarged within the enlarged section of said tubular extension and provided with a valve seat, integral centering projections radially disposed between the inner wall of said tubular extension and the enlarged portion of said interior tube, a valve in direct threaded engagement with the interior wall of said tubular extension beyond said valve seat, and enclosing and retaining means for the valve member directly and removably secured to the outside of said tubular extension.

3. In a valve structure, the combination of a casing having a body portion provided with an inlet, an outlet and a transversely disposed partition therebetween, a tubular member extending laterally from said body portion, an interior valve seat tube threaded in said transverse partition and having its bore near the point of its threaded engagement with said partition, contracted to receive a tool for rotation of said valve seat tube, and a valve threaded to the interior wall of said tubular extension beyond said valve seat.

In testimony whereof I have hereunto set my hand.

LUCIEN W. MUELLER.